US010063677B2

(12) United States Patent
Cavallaro et al.

(10) Patent No.: US 10,063,677 B2
(45) Date of Patent: Aug. 28, 2018

(54) ELECTRONIC DEVICE WITH FLEXIBLE DISPLAY AND HINGED HOUSING, AND CORRESPONDING SYSTEMS AND METHODS

(71) Applicant: Motorola Mobility LLC, Chicago, IL (US)

(72) Inventors: Alberto R Cavallaro, Northbrook, IL (US); Roger W Harmon, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 73 days.

(21) Appl. No.: 15/073,675

(22) Filed: Mar. 18, 2016

(65) Prior Publication Data

US 2017/0272559 A1    Sep. 21, 2017

(51) Int. Cl.
*H04M 1/02*    (2006.01)
*G06F 1/16*    (2006.01)

(52) U.S. Cl.
CPC ........ *H04M 1/0268* (2013.01); *G06F 1/1626* (2013.01); *G06F 1/1641* (2013.01); *G06F 1/1652* (2013.01); *G06F 1/1681* (2013.01); *H04M 1/0216* (2013.01); *H04M 1/0247* (2013.01)

(58) Field of Classification Search
CPC ... G06F 1/16; H04M 1/0268; H04M 1/72519; H04M 1/72522; H04W 77/02
USPC ............. D14/150, 138 R, 138 AA, 138 AB, D14/138 AD, 140, 137; 455/557.3, 550.1
See application file for complete search history.

(56) References Cited

U.S. PATENT DOCUMENTS 8,787,016 B2 *   7/2014  Rothkopf ............ H04M 1/0216
                                                361/679.02
2013/0335929 A1   12/2013 Cavallaro

FOREIGN PATENT DOCUMENTS

| CN | 203014919 | 6/2013 |
|---|---|---|
| EP | 2546721 | 1/2013 |
| EP | 2696257 | 2/2014 |
| KR | 201624151 | 3/2016 |
| WO | 2015/163272 | 10/2015 |
| WO | 2015/191411 | 12/2015 |

OTHER PUBLICATIONS

Morris, Euros , GB1704076.7; Mailed Aug. 23, 2017.

* cited by examiner

*Primary Examiner* — Kamran Afshar
*Assistant Examiner* — Majid Syed
(74) *Attorney, Agent, or Firm* — Philip H. Burrus, IV

(57) ABSTRACT

An electronic device includes a first device housing and a second device housing. A hinge, which can be a multi-link hinge, couples the first device housing to the second device housing. The first device housing is pivotable about the hinge relative to the second device housing. A flexible display is coupled to the first device housing and the second device housing and spans the hinge. The flexible display is to deform when the first device housing pivots about the hinge relative to the second device housing.

20 Claims, 10 Drawing Sheets

ELECTRONIC DEVICE WITH FLEXIBLE DISPLAY AND HINGED HOUSING, AND CORRESPONDING SYSTEMS AND METHODS

BACKGROUND

Technical Field

This disclosure relates generally to electronic devices and corresponding methods, and more particularly to physically deformable electronic devices.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

These smaller, yet more powerful, devices are being used for many different applications in many different environments. It would be advantageous to have improved configurations for operating an electronic device to adapt performance to a given environment or application.

Figure 1:
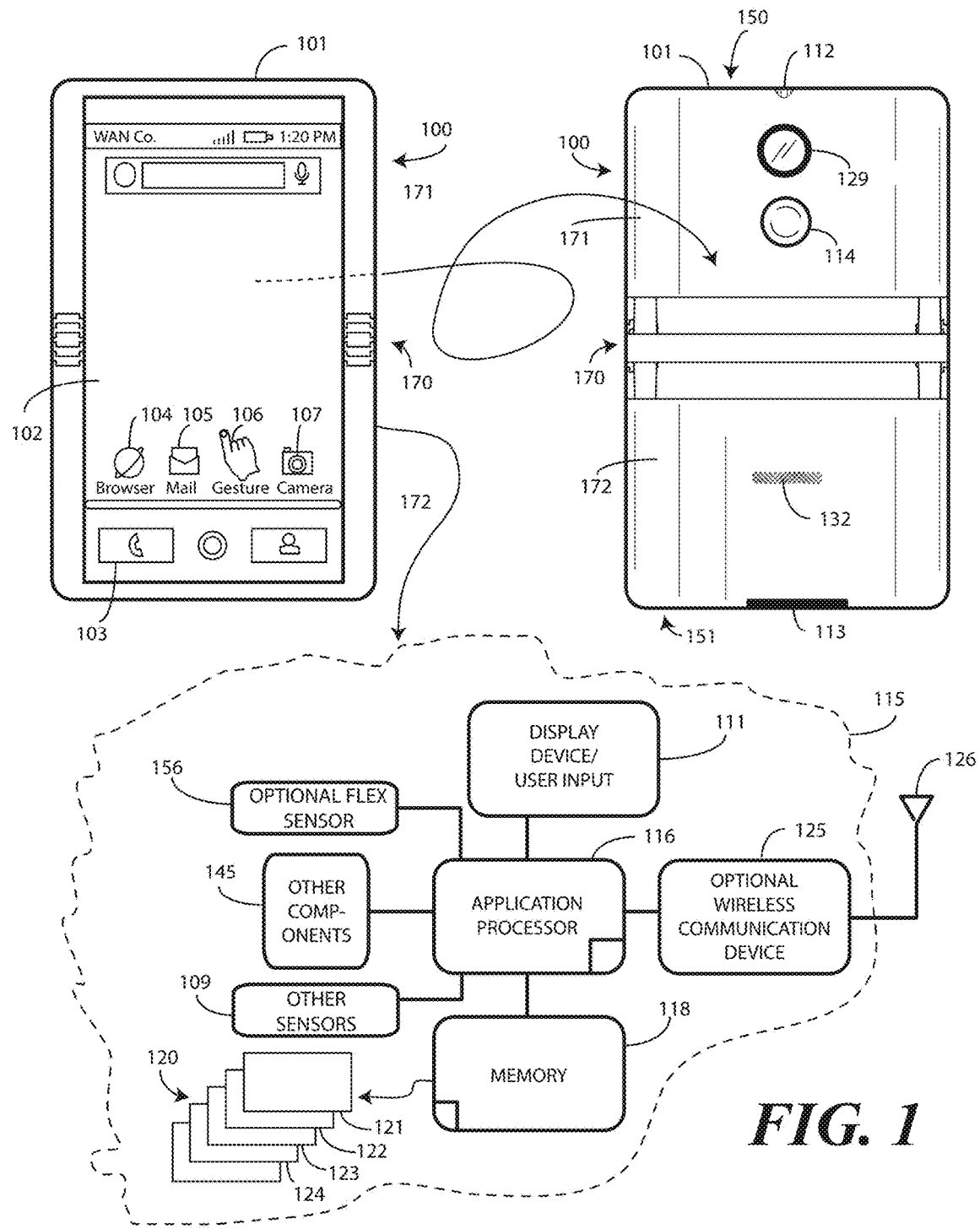
FIG. 1 illustrates a schematic block diagram of one explanatory bendable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a bendable electronic device that includes a flexible display and a housing comprising one or more hinges. The hinged housing allows the electronic device to be deformed by one or more bends. For example, the electronic device can operate in a first configuration where housing portions lie in the same plane. The same electronic device can then be deformed into a bent configuration, such as a tent configuration, to operate in a second configuration. The electronic device can then, in one embodiment, be deformed further into a folded configuration where housing portions are disposed adjacent to each other to operate in a third configuration. Advantageously, this allows a single electronic device to be unfolded and used as a palm top computer in a first configuration, and then folded and used as a smartphone that easily fits in a pocket in a second configuration.

In one or more embodiments, an electronic device includes a first device housing and a second device housing. A hinge couples the first device housing to the second device housing such that the first device housing is pivotable about the hinge relative to the second device housing to one or more of a bent configuration, a folded configuration, or other configuration. In one or more embodiments, a flexible display is coupled to the first device housing and the second device housing and spans the hinge. The flexible display deforms when the first device housing pivots about the hinge relative to the second device housing.

In one or more embodiments, the hinge not only facilitates the bending operation, but provides mechanical support for the flexible display when the bending operation occurs. Embodiments of the disclosure contemplate that bending operations occurring in a housing of an electronic device with a flexible display can present technical challenges. Illustrating by example, it can be difficult to provide uniform mechanical support beneath the flexible display. It can further be difficult to limit deformation due to bending operations such that the deformation occurs within a predefined radius. It can also be challenging to support the various layers as they bend relative to each other away from a neutral axis of the hinge.

Advantageously, embodiments of the disclosure provide solutions to each one of these challenges. Specifically hinges configured in accordance with one or more embodiments of the disclosure provide a solution that provides the needed system flexibility by providing support for the flexible display during bending operations. For example, in one embodiment the hinge comprises a multi-link hinge with continuous support beams, referred to as purlins in the description below, that support a lower side of the flexible display. In one embodiment, the multi-link hinge allows the housing to pivot about a neutral axis of these purlins to create a recess region to receive the purlins. When the purlins are disposed beneath the surface of a flexible display, they provide support for the display while containing its bend within a predefined radius of curvature.

Other features can be incorporated into the hinge as well. For example, in one or more embodiments, one or more struts can be disposed between the device housing portions and the hinge. Springs or other compression devices can operate in conjunction with the struts to bias the device housing portions away from the hinge. During the bending operation, these springs or compression devices can compress, allowing the overall length of the device to change during bending operations. Embodiments of the disclosure contemplate that it can be advantageous to provide an electronic device with a length that is longer in the unbent configuration than in a bent configuration, as this allows, for example, the device to fold compactly so as to fit in a pocket while unfolding to provide a user a larger display surface area. Accordingly, the springs or compression members, operating in tandem with the one or more struts, can bias the device housing portions away from the hinge in the unfolded configuration to provide this additional length. When the device is bent, this length can shorten due to compression of the spring or compression members to contain the bending of the flexible display within a predefined radius. Other features that can be incorporated into the hinge will be described in more detail below. Still others will be obvious to those of ordinary skill in the art having the benefit of this disclosure.

In one or more embodiments, the electronic device includes both a flexible display and a physically deformable housing comprising a multi-link hinge coupling a first device housing to a second device housing such that the electronic device can be bent or folded about the multi-link hinge. Internal and external components can be flexible as well. For instance, flexible batteries and flexible circuit boards can support various components within the electronic device, and can span the multi-link hinge where necessary. Touch sensors and substrates can be flexible as well. Remaining or other components disposed within the electronic device, such as one or more processors, other sensors, and other devices, are arranged such that a user can flex, bend, and/or fold the electronic device by executing a bending operation that physically deforms the flexible display about the multi-link hinge into a deformed geometry.

In one embodiment, one or more optional flex sensors are operable with the one or more processors of the electronic device. Where included, the optional flex sensors can detect a user's bending operation. The one or more flex sensors can also determine a configuration of the deformed geometry after the bending operation. For example, the optional flex sensors can determine whether the electronic device has been deformed into a bent configuration, a folded configuration, or other configuration. The deformability of embodiments of the disclosure not only offers a way to change a long device into a compact, folded device, but can additionally make the device easier to use. For example, by being able to stand an otherwise thin electronic device on a surface when the device is deformed into a bent configuration, the display can become more easily viewable despite the fact that the electronic device is out of the user's hand. Bending the device into bent shapes, such as a tent configuration, allows the device to transform into a "self-standing" device, which can free a user's hands for other activities. In one or more embodiments, different deformed geometries can launch different modes of operation. Illustrating by example, if the electronic device is bent with a single fold, when placed on a table the electronic device can resemble a card folded into a "tent fold." Where this occurs, one or more processors of the electronic device can partition the display into two parts, with each part being on a different side of the "tent."

Turning now to FIG. 1, illustrated therein is one explanatory electronic device 100 configured in accordance with one or more embodiments of the disclosure. The electronic device 100 of FIG. 1 is a portable electronic device. As will be described in more detail below, the inclusion of a hinge 170 between a first device housing 171 and a second device housing 172 allows the electronic device 100 to be bent or folded. Advantageously, this allows the electronic device 100 to function as the equivalent to multiple devices depending upon the amount of deformation about the hinge 170. For example, the electronic device 100 is shown in an unbent configuration in FIG. 1, and accordingly can function as a palm-top computer or tablet computer. However, as will be shown below with reference to FIG. 4, in one embodiment the electronic device 100 can be folded and can accordingly function as a smartphone or other more compact device. It should be obvious to those of ordinary skill in the art having the benefit of this disclosure that the electronic device 100 can function as other devices as a function of its physical geometry, including as a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 102 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 102 may be formed from multiple layers of flexible material such as flexible sheets of polymer or other materials.

The explanatory electronic device 100 of FIG. 1 also includes a housing 101. In one or more embodiments, the housing 101 is divided between a first device housing 171 and a second device housing 172. In this illustrative embodiment, a hinge 170 couples the first device housing 171 to the second device housing 172. The inclusion of the hinge 170 allows the first device housing 171 to be pivotable about the hinge 170 relative to the second device housing 172 so that the electronic device 100 becomes bendable and/or foldable. In one or more embodiments the first device housing 171 and the second device housing 172 are manufactured from a rigid material such as a rigid thermoplastic or composite material, although other materials can be used. Still other constructs will be obvious to those of ordinary skill in the art having the benefit of this disclosure. In the illustrative embodiment of FIG. 1, the housing 101 includes a single hinge 170. However, as will be shown with reference to FIGS. 17-18 below, two or more hinges can be incorporated into other electronic devices.

In this illustrative embodiment, the display 102 is coupled to the first device housing 171 and the second device housing 172. In one embodiment, the lower surface of the display 102, or another layer in the mechanical stack-up of the display 102, can be adhered to the first device housing 171 and the second device housing 172, or alternatively to portions of the first device housing 171 and the second device housing 172. In either embodiment, the display 102 also spans the hinge 170. As will be described in more detail with reference to FIGS. 3-4 below, in one or more embodiments the display 102 is flexible so as to deform when the first device housing 171 pivots about the hinge 170 relative to the second device housing 172.

Features can be incorporated into the first device housing 171 and/or the second device housing 172. Examples of such features include an optional camera 129 or an optional speaker port 132, which are shown disposed on the rear side of the electronic device 100 in this embodiment, but could be placed on the front side as well. In this illustrative embodiment, a user interface component 114, which may be a button or touch sensitive surface, can also be disposed along the rear side of the first device housing 171. As noted, any of these features are shown being disposed on the rear side of the electronic device 100 in this embodiment, but could be located elsewhere, such as on the front side in other embodiments.

In one embodiment, the electronic device 100 includes one or more connectors 112,113, which can include an analog connector, a digital connector, or combinations thereof. In this illustrative embodiment, connector 112 is an analog connector disposed on a first end 150, i.e., the top end, of the electronic device 100, while connector 113 is a digital connector disposed on a second end 151 opposite the first end 150, which is the bottom end in this embodiment.

A block diagram schematic 115 of the electronic device 100 is also shown in FIG. 1. In one embodiment, the electronic device 100 includes one or more processors 116.

In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices, which can include the display 102, to present, images, video, or other presentation information to a user. The executable software code used by the one or more processors 116 can be configured as one or more modules 120 that are operable with the one or more processors 116. Such modules 120 can store instructions, control algorithms, logic steps, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a gesture application 106 configured to detect gesture actions by a user near or along the electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

Figure 4:
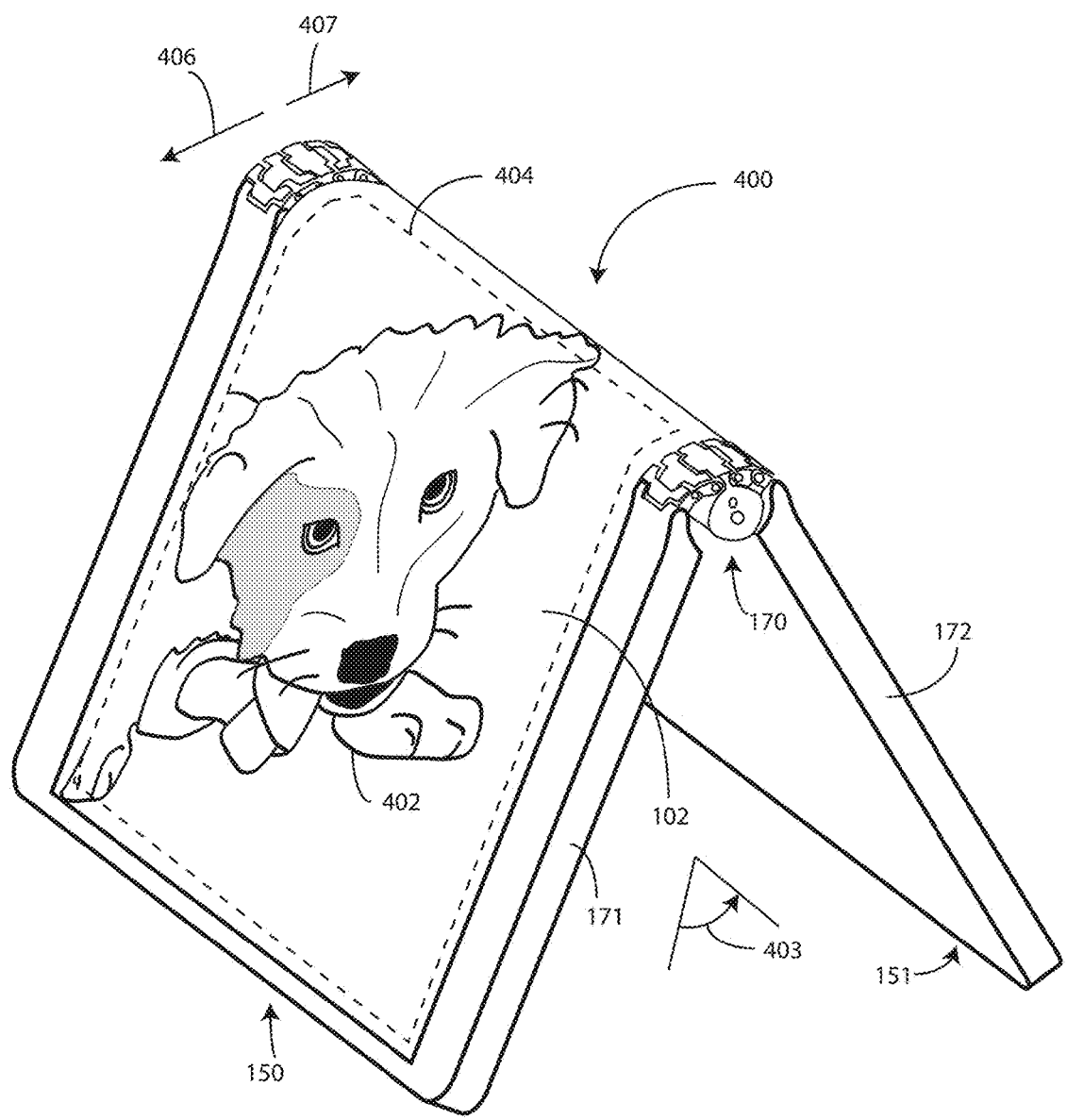
FIG. 4 illustrates one explanatory bendable electronic device having a flexible display and a hinged housing that is deformed to a bent configuration by a bending operation in accordance with one or more embodiments of the disclosure.
Figure 8:
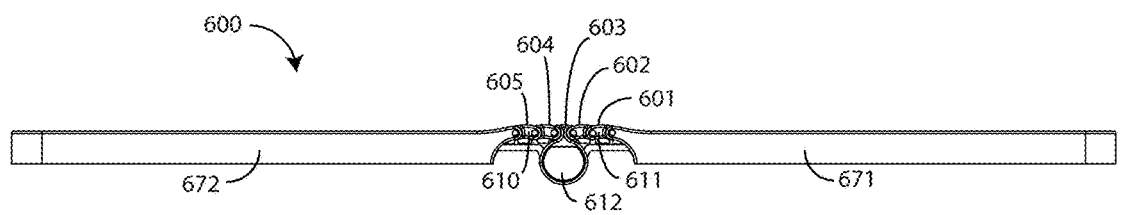

In one embodiment, the electronic device 100 includes one or more flex sensors 156, operable with the one or more processors 116, to detect a bending operation that causes the first device housing 171 to pivot about the hinge 170 relative to the second device housing 172, thereby transforming the electronic device 100 into a deformed geometry, such as that shown in FIGS. 4 and 8. The inclusion of flex sensors 156 is optional, and in some embodiment flex sensors 156 will not be included. Where flex sensors 156 are not included and device operation is a function of the amount the first device housing 171 pivots about the hinge 170 relative to the second device housing 172, the user can alert the one or more processors 116 to the fact that the one or more bends are present through the user interface 111 or by other techniques.

In one embodiment, the flex sensors 156 comprise passive resistive devices manufactured from a material with an impedance that changes when the material is bent, deformed, or flexed. By detecting changes in the impedance as a function of resistance, the one or more processors 116 can use the one or more flex sensors 156 to detect bending of the first device housing 171 about the hinge 170 relative to the second device housing 172. In one or more embodiments, each flex sensor 156 comprises a bi-directional flex sensor that can detect flexing or bending in two directions. In one embodiment, the one or more flex sensors 156 have an impedance that increases in an amount that is proportional with the amount it is deformed or bent.

In one embodiment, each flex sensor 156 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 156 bends, the impedance of the resistive layer changes, thereby altering the flow of current for a given voltage. The one or more processors 116 can detect this change to determine an amount of bending. Taps can be added along each flex sensor 156 to determine other information, including the amount of bending, the direction of bending, and so forth. The flex sensor 156 can further be driven by time-varying signals to increase the amount of information obtained from the flex sensor 156 as well. While a multi-layered device as a flex sensor 156 is one configuration suitable for detecting at least a bending operation occurring to deform the electronic device 100 and a geometry of the electronic device 100 after the bending operation, others can be used as well. Other types of flex sensors 156 will be obvious to those of ordinary skill in the art having the benefit of this disclosure.

In one embodiment, the one or more processors 116 may generate commands or execute control operations based on information received from the various sensors, including the one or more flex sensors 156, the user interface 111, or the other sensors 109. The one or more processors 116 may also generate commands or execute control operations based upon information received from a combination of the one or more flex sensors 156, the user interface 111, or the other sensors 109. Alternatively, the one or more processors 116 can generate commands or execute control operations based upon information received from the one or more flex sensors 156 or the user interface 111 alone. Moreover, the one or more processors 116 may process the received information alone or in combination with other data, such as the information stored in the memory 118.

The one or more other sensors 109 may include a microphone, an earpiece speaker, a second loudspeaker (disposed beneath speaker port 132), and a user interface component 114 such as a button. The one or more other sensors 109 may also include key selection sensors, proximity sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the housing 101 can be used to determine whether the electronic device 100 is being touched at side edges or major faces of the first device housing 171 or the second device housing 172. The touch sensors can include surface and/or housing capacitive sensors in one embodiment. The other sensors 109 can also include audio sensors and video sensors (such as a camera).

The other sensors 109 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 145 operable with the one or more processors 116 can include output components such as video outputs, audio outputs, and/or mechanical outputs. Examples of output components include audio outputs such as speaker port 132, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
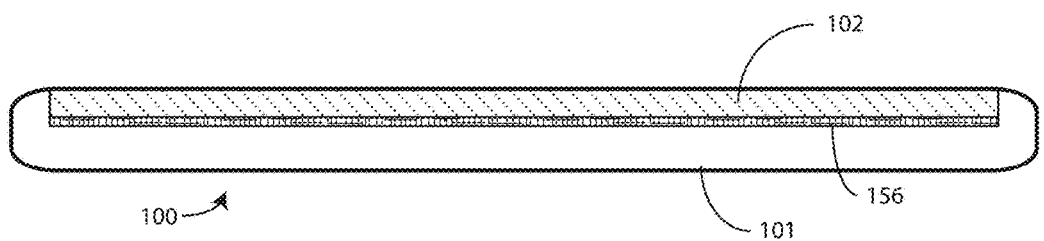
FIG. 2 illustrates a sectional view of one explanatory bendable electronic device in accordance with one or more embodiments of the disclosure.

Turning now to FIG. 2, illustrated therein is a sectional view of the electronic device 100. Shown with the electronic device 100 are the display 102 and the housing 101. The display 102 is flexible in this embodiment. Also shown is the flex sensor 156, which as noted above is optional.

Figure 3:
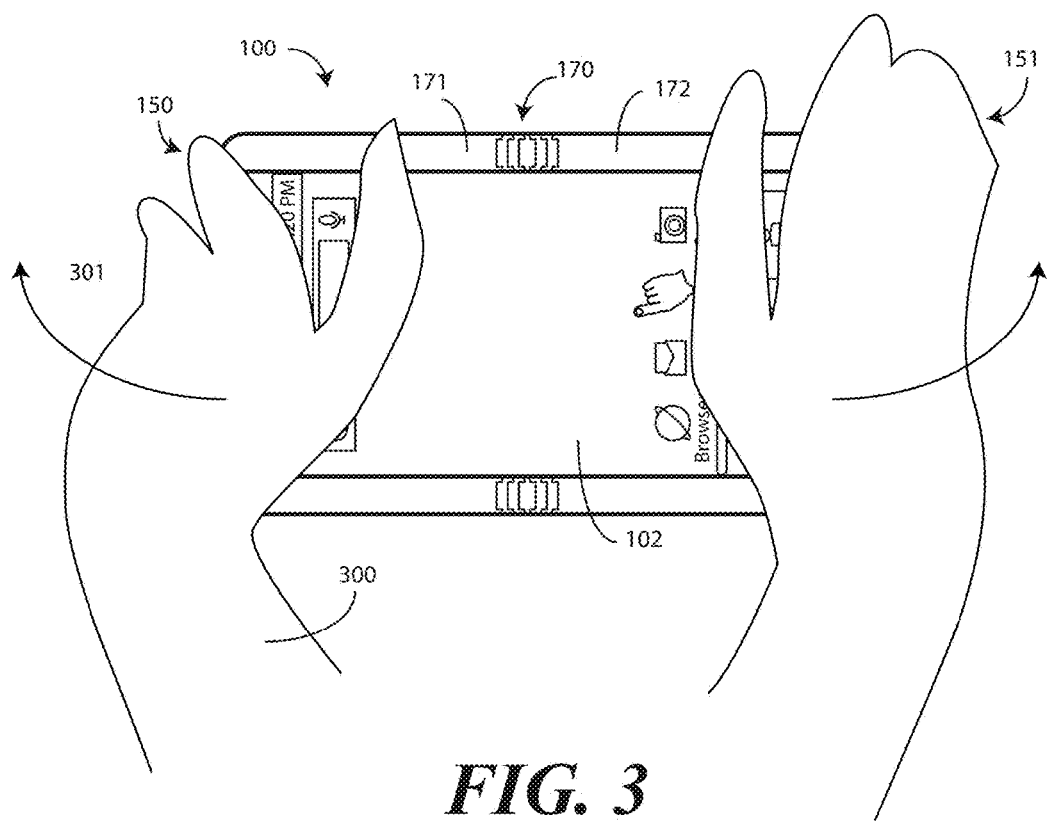
FIG. 3 illustrates a user manipulating one explanatory bendable electronic device in accordance with one or more embodiments of the disclosure to execute a bending operation to deform the bendable electronic device.

Turning now to FIG. 3, a user 300 is executing a bending operation 301 upon the electronic device 100. In this illustration, the user 300 is applying force (into the page) at the first end 150 and the second end 151 of the electronic device 100 to pivot the first device housing 171 about the hinge 170 relative to the second device housing 172. Where other internal components are disposed along flexible substrates that span the hinge 170, these components and or flexible substrates are allowed to bend as well. This method of deforming the housing 101 and display 102 allows the user 300 to simply and quickly bend the electronic device 100 into a desired shape by pivoting the first device housing 171 about the hinge 170 relative to the second device housing 172.

In other embodiments, rather than relying upon the manual application of force, the hinge 170 can include a mechanical actuator to pivot the first device housing 171 about the hinge 170 relative to the second device housing 172. For example, a motor or other mechanical actuator can be operable with structural components to pivot the first device housing 171 about the hinge 170 relative to the second device housing 172 to predetermined angles or geometric alignments in one or more embodiments. The inclusion of a mechanical actuator allows a precise bend angle to be repeatedly achieved without the user 300 having to make adjustments. However, as the inclusion of a mechanical actuator can increase cost, in other embodiments this component will be omitted.

It should be noted that in one or more embodiments, the display 102 has a compliance coefficient that can be used advantageously to help counter the bending operation 301. Illustrating by example, when the bending operation 301 transforms the electronic device 100 to a bent configuration, which is shown below with reference to FIG. 4, in one or more embodiments the mechanical layers of the display 102 are loaded by the bending operation 301 and work to bias the first device housing 171 and the second device housing 172 back to the open position of FIG. 3. Moreover, in one or more embodiments a thin stainless steel plate (approximately 0.04 millimeters in thickness) forms one layer of the display 102 and will increase the loading. This mechanical loading of the layers of the display 102 can be used to help the user 300 transform the electronic device 100 from folded or partially folded configurations to unfolded configurations in one or more embodiments. The modulus of the display 102 can range from 40-300 giga-Pascals in one or more embodiments.

Regardless of whether the bending operation 301 is a manual one or is instead one performed by a mechanical actuator, it results in the display 102 being deformed by one or more bends about the hinge 170. Turning now to FIG. 4, illustrated therein is one result of the bending operation (301) of FIG. 3.

In the illustrative embodiment of FIG. 4, the electronic device 100 has been placed on a table or other flat surface, with the bending operation (301) leaving the electronic device to resemble a card folded into a "tent fold" having a single bend. This bent configuration can make the display 102 easier for the user (300) to view since they do not have to hold the electronic device 100 in their hands.

As shown in FIG. 4, the display 102 is deformed about the hinge 170 as the first device housing 171 and the second device housing 172 are bent into a tent configuration 400. In this illustrative embodiment, the display 102 has a single bend 401 about the hinge 170. However, in other embodiments, such as that shown below in FIGS. 17-18, the display can be deformed with a plurality of bends about a plurality of hinges. Other configurations will be obvious to those of ordinary skill in the art having the benefit of this disclosure.

In one embodiment, the one or more processors (116) of the electronic device 100 are operable to detect that a bending operation (301) is occurring by detecting a change in an impedance of the one or more flex sensors (156). The one or more processors (116) can detect this bending operation (301) in other ways as well. For example, the touch sensors can detect touch and pressure from the user (300). Alternatively, the proximity sensors can detect the first end 150 and the second end 151 of the electronic device 100 getting closer together. Force sensors can detect an amount of force that the user (300) is applying to the first device housing 171 and the second device housing 172 as well. The user (300) can input information indicating that the electronic device 100 has been bent using the display 102 or other user interface (111). Other techniques for detecting that the bending operation (301) has occurred will be obvious to those of ordinary skill in the art having the benefit of this disclosure.

In one or more embodiments, the one or more processors (116) can partition the display 102 of the electronic device 100 as another function of the geometric alignment of the first device housing 171 and the second device housing 172 resulting from the bending operation (301). For example, in this embodiment the display 102 has been partitioned into a first portion 404 and a second portion (facing into the page), with each portion being disposed on opposite sides of the "tent." In one or more embodiments, the one or more processors (116) can detect a bend amount 403 as well.

In one or more embodiments, the one or more processors (116) of the electronic device are operable to, when the display 102 is deformed by one or more bends, present a first image 402 on a first portion 404 of the display 102, while presenting a second image on a second portion (facing into the page) of the display 102. In this illustrative embodiment, the first portion 404 of the display 102 is disposed on a first side 406 of the single bend 401, while the second portion is disposed on a second side 407 of the single bend 401.

The tent configuration 400 of FIG. 4 is referred to as a bent configuration because the first device housing 171 has been partially pivoted about the hinge 170 relative to the second device housing 172 such that the electronic device 100 is deformed to define an angle between the first device housing 171 and the second device housing 172. By contrast, turning now to FIG. 5, the electronic device 100 can also be deformed to a folded configuration 500 where the second device housing 172 is bent over on the first device housing 171 such that the second device housing 172 covers the first device housing.

Figure 5:
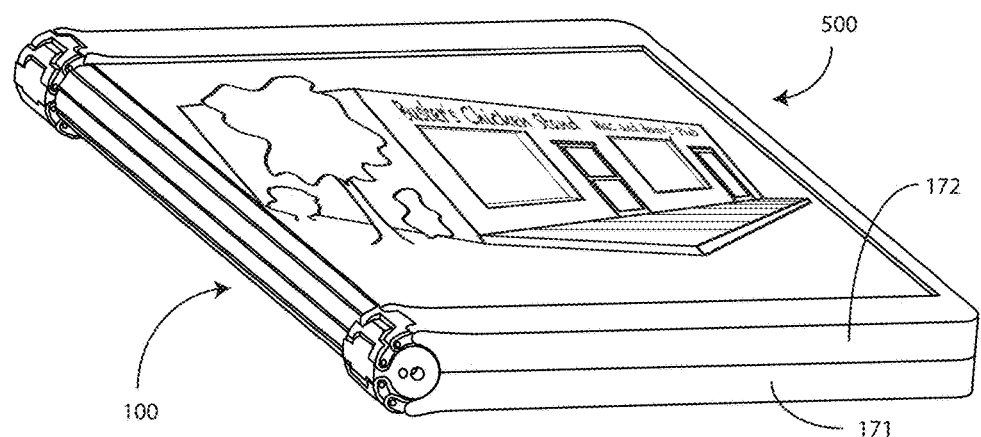
FIG. 5 illustrates one explanatory bendable electronic device having a flexible display and a hinged housing that is deformed to a folded configuration by a bending operation in accordance with one or more embodiments of the disclosure.

By comparing FIGS. 1, 4, and 5, it can be seen that the electronic device 100 can operate in at least three different configurations. A first configuration is an open configuration, such as that shown in FIG. 1, where the first device housing 171 and the second device housing 172 are coplanar. A second configuration is a bent configuration, such as that shown in FIG. 4, where the first device housing 171 has been partially pivoted about the hinge 170 relative to the second device housing 172 such that the electronic device 100 is deformed to define an angle between the first device housing 171 and the second device housing 172 with the hinge 170 as the vertex of the angle. It should be noted that the bent configuration can comprise a plurality of configurations, as first device housing 171 can be pivoted about the hinge 170 relative to the second device housing 172 by varying amounts. A third configuration is a folded configuration, such as that shown in FIG. 5, where the second device housing 172 is bent over on the first device housing 171 such that the second device housing 172 covers the first device housing.

In one or more embodiments, the operational mode of the electronic device 100 can change as a function of its geometry. Illustrating by example, the electronic device 100 might function as a palm-top computer when in the open configuration. By contrast, when in the bent configuration, the electronic device 100 may function as an alarm clock, as the electronic device 100 easily rests on a flat surface. Alternatively, as shown in FIG. 4, the electronic device 100 may enter a picture-sharing mode when in the bent configuration. When in the folded configuration of FIG. 5, the electronic device 100 may function as a smartphone or other device. These functions are illustrative only, as the geometry-based predefined mode of operation could also be any number of other modes, as will be obvious to those of ordinary skill in the art having the benefit of this disclosure.

Figure 6:
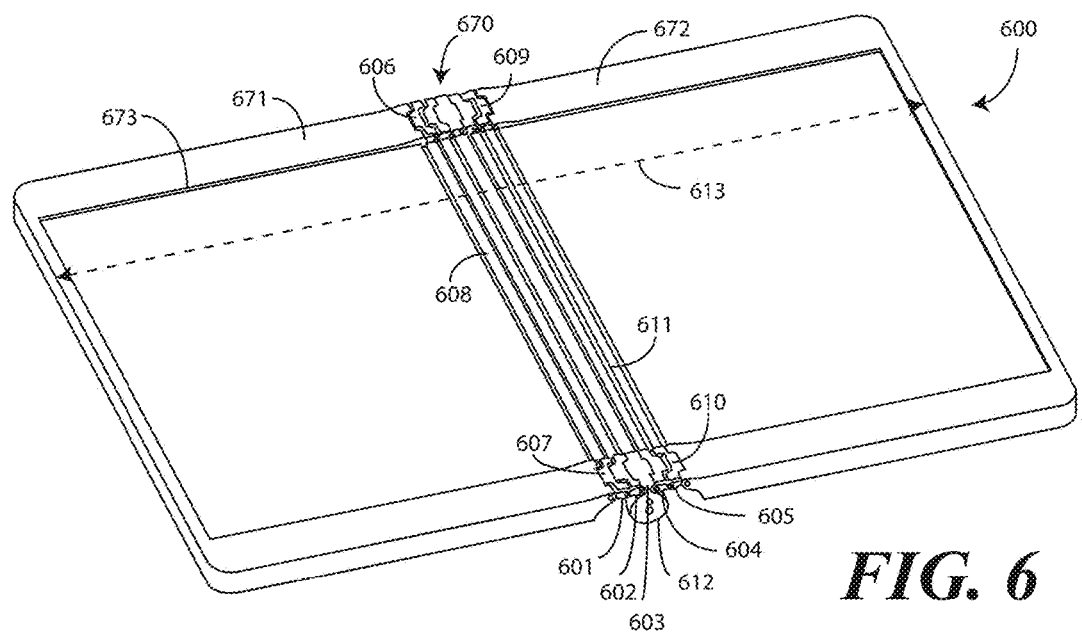
FIGS. 6-8 illustrate one explanatory bendable electronic device comprising a first explanatory hinged housing in accordance with one or more embodiments of the disclosure.
Figure 7:
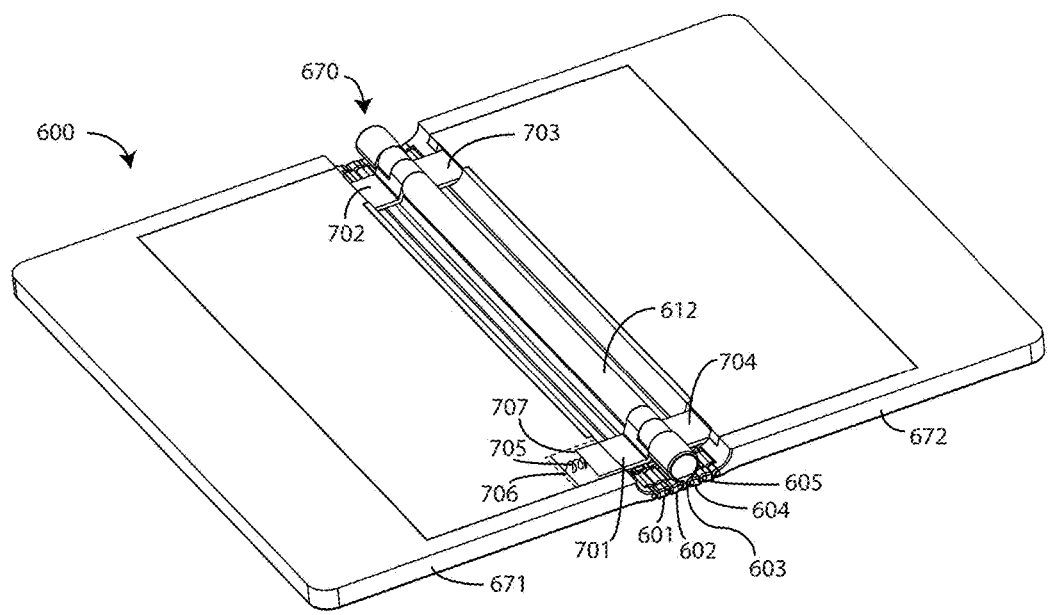

Turning now to FIGS. 6-8, illustrated therein is an electronic device 600 having a first hinge 670 coupling a first device housing 671 with a second device housing 672 in accordance with one or more embodiments of the disclosure. As with previous embodiments, the hinge 670 facilitates pivoting of the first device housing 671 relative to the second device housing 672. A recess 673 is provided in the first device housing 671 and the second device housing 672 where a flexible display may be coupled such that the flexible display spans the hinge 670. In FIGS. 6-8, the flexible display is not shown so that the details of the hinge 670 may be more clearly seen. However, as with previous embodiments, when the flexible display is positioned within the recess 673 so as to be coupled to each of the first device housing 671 and the second device housing 672, the flexible display would span the hinge 670 and would deform when the first device housing 671 pivots about the hinge 670 relative to the second device housing 672 as previously described.

In this illustrative embodiment, the hinge 670 comprises one or more linkage members 601,602,603,604,605. Accordingly, the hinge 670 defines a multi-link hinge between the first device housing 671 and the second device housing 672 in this illustrative embodiment. Here, the hinge 670 comprises five linkage members 601,602,603,604,605. However, in other embodiments, the hinge 670 can include fewer linkage members or more linkage members based upon application. In one embodiment, each of the linkage members 601,602,603,604,605 is stepped with the rigid purlins therebetween to receive and protect the flexible display. In one or more embodiments, a locking bar can be integrated with the linkage members 601,602,603,604,605 to further improve rigidity and constrain motion.

In this illustrative embodiment, each linkage member 601,602,603,604,605 comprises a first link and a second link separated by a purlin. For example, linkage member 601 comprises a first link 606, a second link 607, and a purlin 608 that separates the first link 606 and the second link 607. Similarly, linkage member 605 comprises a first link 609, a second link 610, and a purlin 611 that separates the first link 609 and the second link 610. The remaining linkage members 603,604,605 are similarly configured. As each linkage member 601,602,603,604,605 has links 606,607,609,610 that pass about the sides of the recess 673, while the purlins 608,611 pass beneath the recess 673, in this embodiment the each linkage member 601,602,603,604,605 of the multi-link hinge passes about three sides, i.e., two minor faces and one major face, of the flexible display.

As used herein, a "purlin" is defined as a beam along a width of the flexible display, which rests between two links and supports a major face the flexible display. This is similar to the architectural purlin, which is a horizontal beam along the length of a roof, resting on a main rafter and supporting the common rafters or boards. The purlins 608,611 disposed between the first links 606,609 and the second links 607,610 not only separate the links, but also provide mechanical support along the major face of the flexible display disposed adjacent to the first device housing 671 and the second device housing 672. Said differently, in one or more embodiments, the one or more purlins 608,611 spanning a width of the flexible display to support the flexible display when the first device housing 671 pivots about the hinge 670 relative to the second device housing 672. This will be shown in more detail below with reference to FIGS. 9-10.

In this illustrative embodiment, linkage members 601, 602,604,605 are all similarly configured, with a first link 606,609, a second link 607,610, and purlins 608,611 separating the first link 606,609 and the second link 607,610. However, the central linkage member, i.e., linkage member 603, is configured slightly differently in that it comprises a pivot 612. As will be described in more detail below with reference to FIG. 11, in one or more embodiments the pivot 612 can be configured with mechanical features that provide drive functions, resistance functions, stage stop functions, and other functions that alter the way that the first device housing 671 pivots about the hinge 670 relative to the second device housing 672. For example, the pivot 612 can house cam and follower assemblies, geared assemblies, spring assemblies, and other assemblies that assist the way that the first device housing 671 pivots about the hinge 670 relative to the second device housing 672, oppose the way that the first device housing 671 pivots about the hinge 670 relative to the second device housing 672, or otherwise increase or decrease the amount of force required to pivot the first device housing 671 about the hinge 670 relative to the second device housing 672. In this illustrative embodiment, the pivot 612 is coupled between at least one linkage member, e.g., linkage member 601 having first link 606, second link 607, and purlin 608 on a first side and at least another linkage member, e.g., linkage member 605 having first link 609, second link 610, and purlin 611 on a second side.

In one or more embodiments, the hinge 670 is responsible for providing one or more different mechanical functions for the electronic device 600. Illustrating by example, when the first device housing 671 and the second device housing 672 are coplanar in the open position as shown in FIGS. 6-8, the hinge 670 is to provide full support for the major face of the flexible display disposed adjacent to the first device housing 671 and the second device housing 672. Moreover, when the electronic device 600 is in the folded position, as was the case for electronic device (500) of FIG. 5, the hinge 670 is to provide full support for the major face of the flexible display disposed adjacent to the first device housing 671 and the second device housing 672 along the bend zone defined between the first device housing 671 and the second device housing 672.

In one or more embodiments, the hinge 670 can be configured to provide one or more optional mechanical functions as well. For example, in one embodiment, when the first device housing 671 and the second device housing 672 are coplanar in the open position as shown in FIGS. 6-8, the hinge 670 is to provide a stop stage that operates to retain the first device housing 671 and the second device housing 672 in the coplanar arrangement. If the amount of force required to pivot the first device housing 671 about the hinge 670 relative to the second device housing 672 is, for example, five Newtons ordinarily, the inclusion of a stop stage when the first device housing 671 and the second device housing 672 are coplanar in the open position may require a greater amount of force, such as eleven Newtons, to bend the electronic device 600 from the open position.

In one or more embodiments, the hinge 670 is not only operable to facilitate pivoting the first device housing 671 relative to the second device housing 672, but also to separate the first device housing 671 from the second device housing 672 when the first device housing 671 and the second device housing 672 are coplanar in the open position. Embodiments of the disclosure contemplate that for optimal bending of the flexible display, it can be advantageous for the overall length 613 of the electronic device 600 to change during bending operations. Illustrating by example, embodiments of the disclosure contemplate that maximum support for the flexible display occurs when the electronic device is shorter in the tent configuration than when in the open position or folded position. This is true because reducing the length 613 during bending allows for the equivalent of a service loop to be defined in the flexible display, thereby reducing wear. Accordingly, in one or more embodiments the hinge 670 is configured to separate the first device housing 671 from the second device housing 672 when the first device housing 671 and the second device housing 672 are coplanar in the open position. In another embodiments, the hinge 670 is configured to separate the first device housing 671 from the second device housing 672 when the first device housing 671 and the second device housing 672 are coplanar in the open position, and also to bias the first device housing 671 and the second device housing 672 away from the hinge 670 when in the folded position. As used herein, the term "bias" means to apply a force so as to effect an action. Thus, biasing the first device housing 671 from the hinge 670 would comprise an application of force tending to move the first device housing 671 away from the hinge 670.

In one embodiment, this variation in length 613 is facilitated by the inclusion of one or more struts 701,702,703,704 disposed between the first device housing 671 and the second device housing 672 and the pivot 612. In one embodiment, one or more struts 701,702,703,704 are coupled to the pivot 612 to bias one or more of the first device housing 671 or the second device housing 672 distally away from the pivot 612. For example, one or more compressible springs 705 can be disposed between each strut and an engagement point 706 at the device housing. These compressible springs 705 can compress, due to the shape of internally translating surfaces within the pivot 612, when the first device housing 671 pivots relative to the second device housing 672. When the first device housing 671 and the second device housing 672 are in the open or folded position, the compressible springs 705 can be preloaded between each strut end 707 and engagement point 706 to bias one or more of the first device housing 671 or the second device housing 672 distally away from the pivot 612 in the open position in one or more embodiments. In one embodiment, when the first device housing 671 and the second device housing 672 are in the open position, the compressible springs 705 can be preloaded between each strut end 707 and engagement point 706 to bias one or more of the first device housing 671 or the second device housing 672 distally away from the pivot 612, thereby stretching the flexible display, with a force of about four Newtons being applied to each end of the flexible display.

Figure 9:
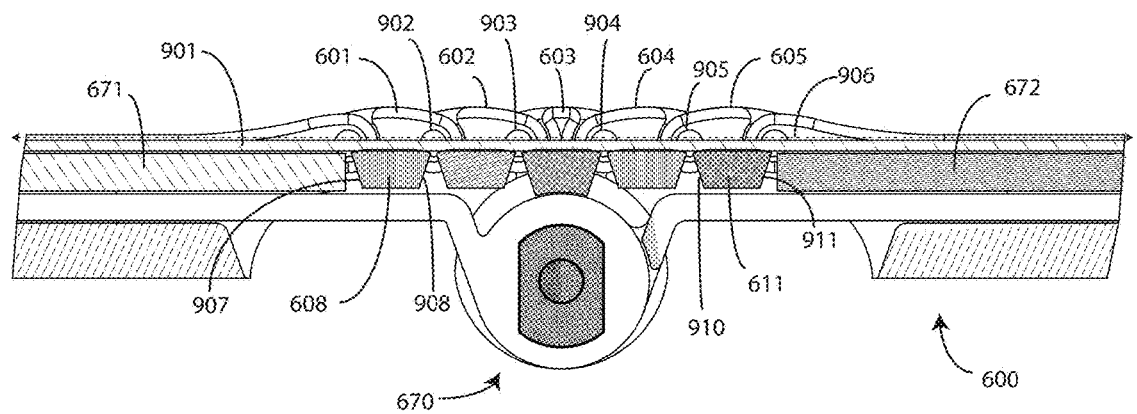
FIGS. 9-10 illustrate one or more sectional views of a first explanatory hinged housing in accordance with one or more embodiments of the disclosure.
Figure 10:
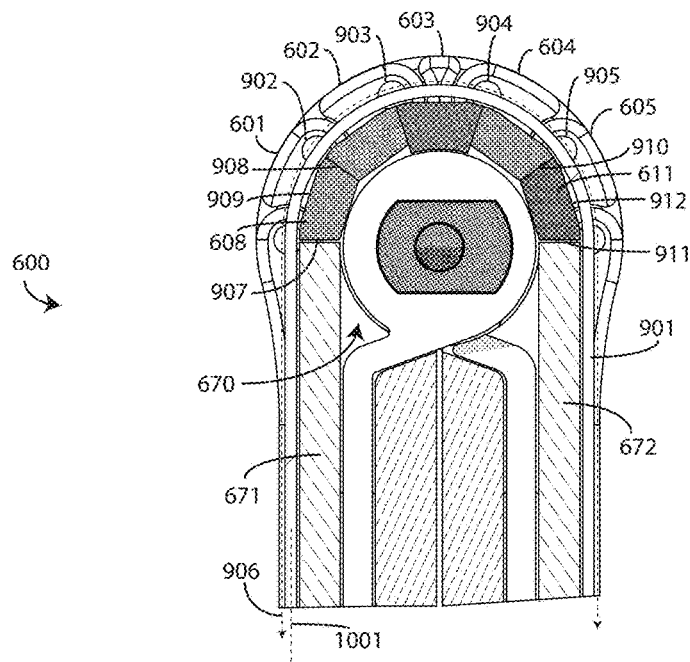

Turning now to FIGS. 9 and 10, illustrated are sectional views of the electronic device 600 of FIGS. 6-8, but with a flexible display 901 positioned within the recess 673 of the first device housing 671 and the second device housing 672. As can be seen in these magnified views, in one or more embodiments the one or more linkage members 601,602, 603,640,605 are coupled together by one or more pins 902,903,904,905. In one embodiment, the one or more pins 902,903,904,905 define a pin line 906 when the first device housing 671 and the second device housing 672 are coplanar in the open position as shown in FIG. 9. In one embodiment, the one or more pins 902,903,904,905 are separated by a center-to-center distance of about 3.2 millimeters for a given electronic device having a display size of between seven and eight inches that is configured to operate as a smartphone when folded and a tablet when opened. These dimensions are illustrative only, as the center-to-center dimensions of the one or more pins 902,903,904,905 will change for other size electronic devices or other applications. Such other dimensions will be obvious to those of ordinary skill in the art having the benefit of this disclosure.

In this illustrative embodiment, at least a portion of the flexible display 901 intersects a plane defined by the pin line 906. For example, as shown in FIG. 9, at least a portion of the flexible display 901 is disposed within a plane defined by the pin line 906 when the first device housing 671 and the second device housing 672 are coplanar in the open position. In one embodiment, a center line of the flexible display sits within the plane defined by the pin line 906 such that the plane defined by the pin line 906 and the flexible display 901 are coplanar. However, in other embodiments, only a portion of the flexible display 901 sits within the plane defined by the pin line 906 due to the fact that the plane defined by the pin line 906 and the center line of the flexible display 901 are slightly offset.

Illustrating by example, in FIG. 10 the electronic device 600 is shown in the folded position with the first device housing 671 bent about the hinge 670 so that it covers the second device housing 672. As best shown in this figure, the centerline 1001 of the flexible display 901 is disposed slightly below the pin line 906, which is curved in this embodiment, such that the bending radius of the flexible display 901 is slightly smaller than the bending radius of the pin line 906. For instance, the bending radius of the flexible display might be 5.1 millimeters while the bending radius of the pin line 906 might be 5.18 millimeters for a given electronic device having a display size of between seven and eight inches that is configured to operate as a smartphone when folded and a tablet when opened. It should be noted that the centerline 1001 of the flexible display 901 occurs at the center of the thickness of the flexible display 901, rather than along either the front surface or the rear surface of the flexible display 901. For instance, while the centerline 1001 has a bend radius of 5.1 millimeters, the top surface (facing outward from the electronic device 600) would have a larger bend radius, such as about 5.3 millimeters. Note also that these dimensions are illustrative only, as the size of the hinge 670 will affect the absolute measurements. Nonetheless, these measurements illustrate that in on embodiment the pin line 906 defines a greater bend radius about the hinge 670 than the flexible display 901. Other absolute measurements for other size electronic devices or other applications will be obvious to those of ordinary skill in the art having the benefit of this disclosure.

There is another point worthy of note with reference to FIGS. 9-10. Recall from above that in one or more embodiments when the first device housing 671 and the second device housing 672 are coplanar in the open position, as shown in FIG. 9, the hinge 670 is to provide full support for the major face of the flexible display 901 disposed adjacent to the first device housing 671 and the second device housing 672. At the same time, when the electronic device 600 is in the folded position, as shown in FIG. 10, the hinge 670 is to provide full support for the major face of the flexible display 901 disposed adjacent to the first device housing 671 and the second device housing 672 along the bend zone defined between the first device housing 671 and the second device housing 672. In one or more embodiments, the cross sectional shape of each purlin 608,611 is designed to facilitate this dual support functionality.

For example, as shown in FIGS. 9-10, in one embodiment the side members 907,908,910,911 of the purlins 608,611 taper from a base member 909,912 as they extend distally away from the flexible display 901. This partial frustoconical/semi-trapezoidal shape allows the purlins 608,611 to support the flexible display 901 in both the open configuration of FIG. 9 and the folded configuration of FIG. 10. It should also be noted that the base members 909,912 can take varying shapes. In one embodiment, the base members 909,912 are substantially planar. In another embodiment, the base members 909,912 comprise a planar central member disposed between chamfered edges as shown in FIGS. 9-10. In yet another embodiment, the base members 909,912 are convex. Still other shapes for the base members 909,912 will be obvious to those of ordinary skill in the art having the benefit of this disclosure.

Figure 11:
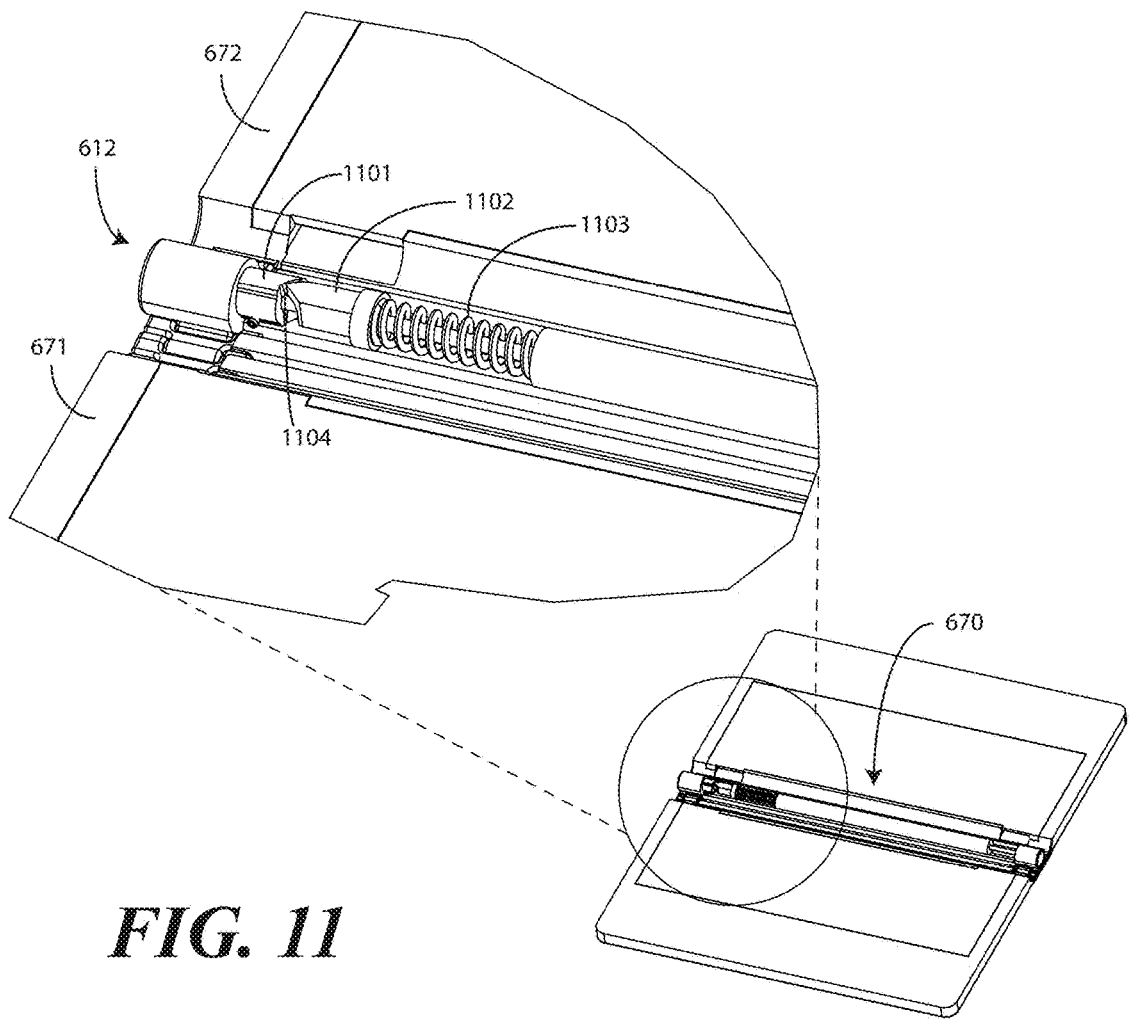
FIG. 11 illustrates one explanatory cam and follower suitable for use in one or more hinges in accordance with one or more embodiments of the disclosure.

Turning now to FIG. 11, illustrated therein are internal components of one explanatory pivot 612 in accordance with one or more embodiments of the disclosure. Recall from above that in one or more embodiments, the pivot 612 can provide optional features in addition to the support features of the linkage members. For example, the pivot 612 can provide a stop stage that operates to retain the first device housing 671 and the second device housing 672 in the open position, the tent fold position, or in the folded position. In one embodiment, this can be accomplished by using a cam 1101 and follower 1102 in the pivot 612, where the follower 1102 is biased against the cam 1101 by a spring 1103 or other compression member. By using the cam 1101 and follower 1102, one or more detents 1104 can be included in the cam 1101 to retain the first device housing 671 at a predefined axial alignment relative to the second device housing 672 about the hinge 670. Accordingly, the one or more detents 1104 can provide the required stop stage that operates to retain the first device housing 671 and the second device housing 672 in one or more of the open position, the tent fold position, or in the folded position.

While a cam 1101 and follower 1102 are one example of a mechanical feature suitable for providing stop stages or otherwise acting as a pivot restrictor, others, including asymmetrical or asphyrical translating surfaces can be used as well. In another embodiment, a mechanical latch can provide the stop stage. In still another embodiment, magnets can be used to provide stop stages. For instance, magnets can be placed in the first device housing 671 and the second device housing 672 to retain the first device housing 671 and the second device housing 672 in the folded position. Frictional elements can be added within the pivot 612 to retain the first device housing 671 and the second device housing 672 in any of the open, tent, or folded configurations. A stator motor could be integrated into the pivot 612 to provide the stop stages as well. Still other mechanical structures for providing stop stages will be obvious to those of ordinary skill in the art having the benefit of this disclosure.

Figure 12:
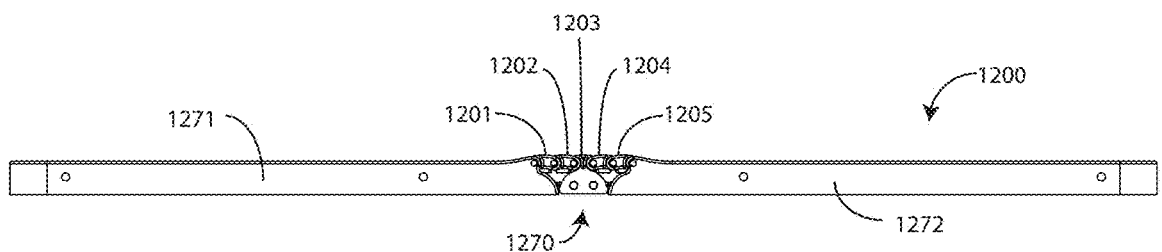
FIGS. 12-13 illustrate another explanatory electronic device comprising a second explanatory hinged housing in accordance with one or more embodiments of the disclosure.
Figure 13:
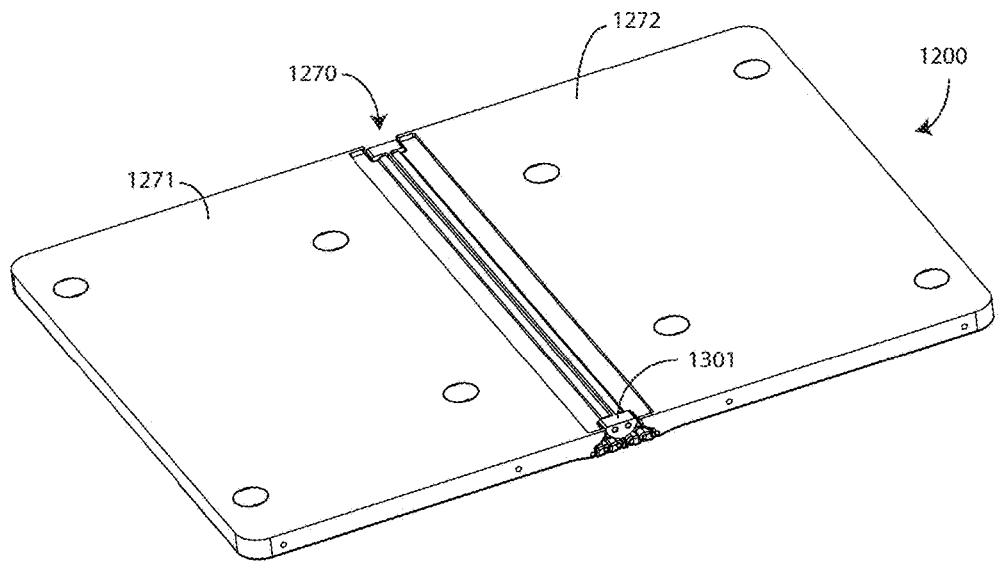

Turning now to FIGS. 12-13, illustrated therein is another electronic device 1200 having a hinge 1270 coupling a first device housing 1271 with a second device housing 1272 in accordance with one or more embodiments of the disclosure. As with previous embodiments, the hinge 1270 facilitates pivoting of the first device housing 1271 relative to the second device housing 1272. A flexible display (not shown in FIGS. 12-13) can couple to the first device housing 1271 and the second device housing 1272 such that it spans the hinge 1270. When the first device housing 1271 pivots relative to the second device housing 1272 about the hinge 1270, the flexible display deforms in response to the bending motion as previously described.

As with the embodiment of FIGS. 6-8, in this illustrative embodiment, the hinge 1270 comprises one or more linkage members 1201,1202,1203,1204,1205. Accordingly, the hinge 1270 defines a multi-link hinge between the first device housing 1271 and the second device housing 1272 in this illustrative embodiment. Each linkage member 1201, 1202,1203,1204,1205 comprises a first link and a second link separated by a purlin as previously described. In this illustrative embodiment, each linkage member 1201,1202, 1203,1204,1205 of the multi-link hinge passes about three sides, i.e., two minor faces and one major face, of the flexible display.

Figure 14:
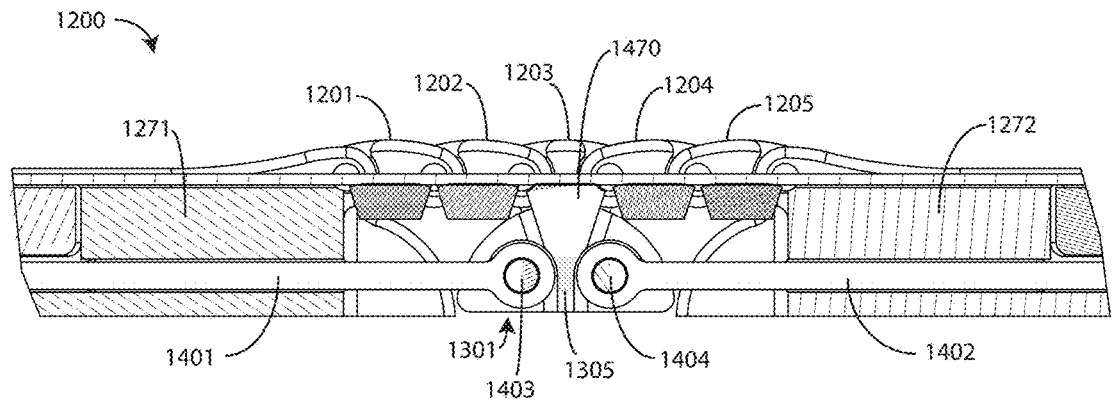
FIGS. 14-15 illustrate one or more sectional views of a second explanatory hinged housing in accordance with one or more embodiments of the disclosure.
Figure 15:
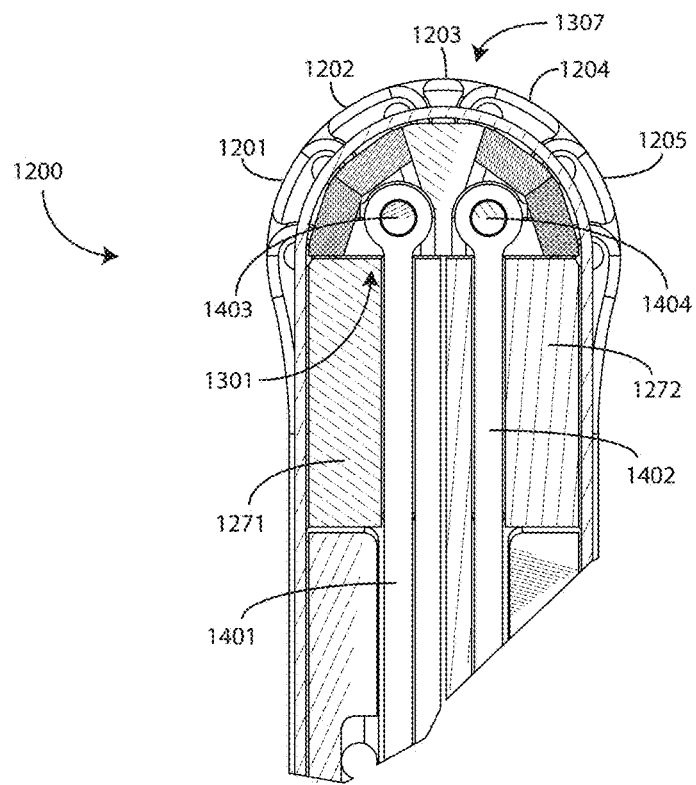

In this illustrative embodiment, linkage members 1201, 1202,1204,1205 are all similarly configured, with a first link, a second link, and purlins separating the first link and the second link. However, the central linkage member, i.e., linkage member 1203, is configured slightly differently. In contrast to the embodiment of FIGS. 6-8, rather than having the pivot (612) of FIGS. 6-8 coupled between linkage members (601,605), the hinge 1270 of FIGS. 12-13 comprises a dual hinge 1301. In this illustrative embodiment, the dual hinge 1301 is coupled between at least one linkage member, e.g., linkage member 1201, on a first side and at least another linkage member, e.g., linkage member 1205, on a second side. Turning now to FIGS. 14-15, the dual hinge 1301 is shown in more detail.

In one embodiment, the dual hinge 1301 defines a pivot 1470 that comprises a first strut 1401 disposed between the pivot 1470 and the first device housing 1271. In one embodiment, the first strut 1401 is pivotable about a first axis 1403. The dual hinge 1301 also comprises a second strut 1402 disposed between the pivot 1470 and the second device housing 1272. In one embodiment, the second strut is pivotable about a second axis 1404 that is different from the first axis 1403.

As with the embodiment of FIGS. 6-8 above, each of the struts 1401,1402 can be configured to separate the first device housing 1271 from the second device housing 1272 when the first device housing 1271 and the second device housing 1272 are coplanar in the open position. As such, in one embodiment one or more compressible springs can be disposed between each strut 1401,1402 and an engagement point between a strut end and the respective device housing. These compressible springs can compress when the first device housing 1271 pivots relative to the second device housing 1272. When the first device housing 1271 and the second device housing 1272 are in the open or folded position, the compressible springs can be preloaded between each strut end and engagement point to bias one or more of the first device housing 1271 or the second device housing 1272 distally away from the dual hinge 1301 in the open position in one or more embodiments as previously described. Accordingly, in one or more embodiments the struts 1401,1402 can be spring loaded to bias the bendable electronic device 1200 in one or more of an open position with the first device housing 1271 and the second device housing 1272 disposed on opposite sides of the multi-link hinge defined by the linkage members 1201,1202,1203, 1204,1205, or a closed position with the first device housing 1271 and the second device housing 1272 disposed on a common side of the multi-link hinge defined by the linkage members 1201,1202,1203,1204,1205 as was the case with the embodiment of FIGS. 6-8.

In one or more embodiments, since the two struts 1401, 1402 pivot about different axes 1403,1404, movement of each strut 1401,1402 can be controlled to assist, or inhibit, pivoting of the first device housing 1271 relative to the second device housing 1272. For example, in one or more embodiments, a frictional coupler 1305 can be disposed between the first strut 1401 and the second strut 1402 to oppose motion of any of the first strut 1401 about the first axis 1403, the second strut 1402 about the second axis 1404, or combinations thereof. In this illustrative embodiment, the frictional coupler 1305 functions as a pivot restrictor operable to oppose motion of the first device housing 1271 or the second device housing 1272 about the multi-link hinge defined by the linkage members 1201,1202,1203,1204, 1205.

Other motion assisting or retarding components can be used in place of the frictional coupler 1305 as well. For example, in another embodiment the first strut 1401 can be geared with the second strut 1402 so as to allow the first device housing 1271 to pivot to any desired angle about the multi-axis hinge 1301 relative to the second device housing 1272 much in the same way that a laptop display pivots relative to its keyboard. Other mechanical interfaces between the first strut 1401 and the second strut 1402 to assist or impede pivoting of the first device housing 1271 or the second device housing 1272 about the multi-axis hinge 1301 will be obvious to those of ordinary skill in the art having the benefit of this disclosure.

Figure 16:
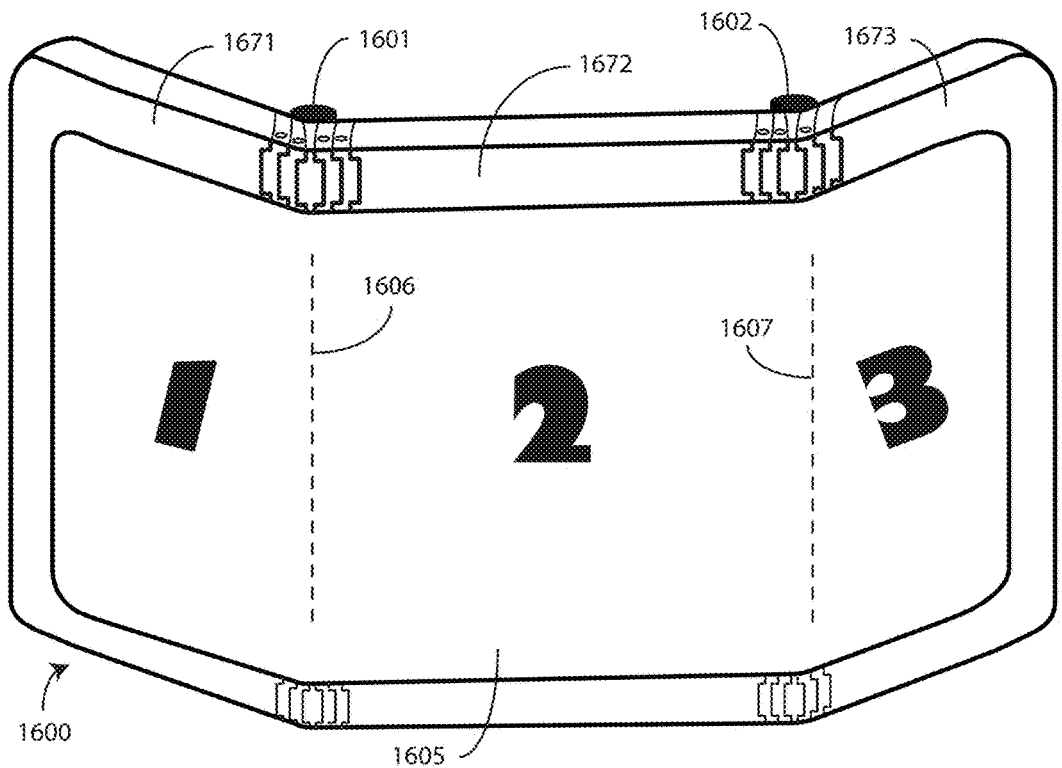
FIG. 16 illustrates yet another explanatory bendable electronic device having a flexible display and a plurality of hinges along its housing, deformed to a bent configuration by a bending operation, in accordance with one or more embodiments of the disclosure.
Figure 17:
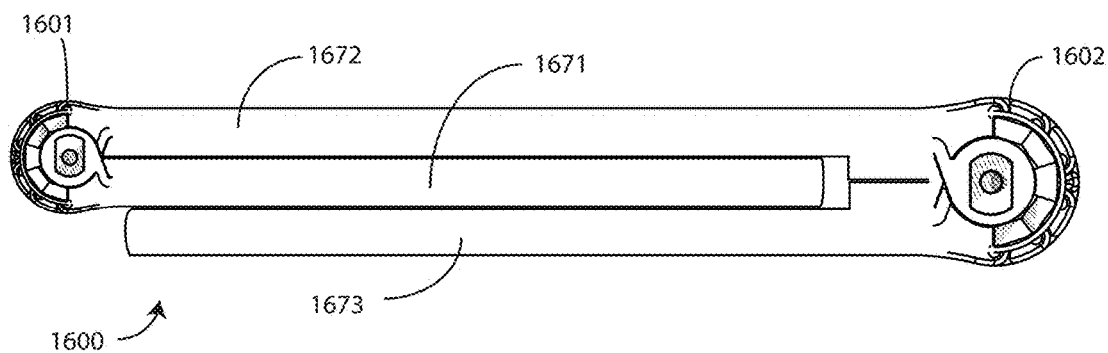
FIG. 17 illustrates still another explanatory bendable electronic device having a flexible display and a plurality of hinges along its housing, deformed to a folded configuration by a bending operation, in accordance with one or more embodiments of the disclosure.

To this point, electronic devices have been described having a single hinge, be it with a pivot or multi-link. However, embodiments of the device are not so limited. Turning now to FIG. 16 illustrated therein is another electronic device 1600 configured in accordance with one or more embodiments of the disclosure. As shown in FIG. 16, the electronic device 1600 is bendable and includes a first multi-link hinge 1601 coupling a first device housing 1671 to a second device housing 1672, and a second multi-link hinge 1602 coupling the second device housing 1672 to a third device housing 1673. A flexible display 1605 is coupled to the first device housing 1671, the second device housing 1672, and the third device housing 1673, and spans both the first multi-link hinge 1601 and the second multi-link hinge 1602. This allows the electronic device to bend along two axes 1606,1607. As shown in FIG. 17, where the first multi-link hinge 1601 and the second multi-link hinge 1602 are different sizes, the electronic device 1600 can define a dual-folded electronic device with the first device housing 1671 bent about the first multilink hinge 1601 so as to be covered by the second device housing 1672. Similarly, the third device housing 1673 can bend about the second multi-link hinge 1602 so as to be covered by both the first device housing 1671 and the second device housing 1672. The number, orientation, and location of multi-link hinges of FIGS. 16-17 are illustrative only, as others will be obvious to those of ordinary skill in the art having the benefit of this disclosure.

As with previous embodiments, one or both of the first multi-link hinge 1601 or the second multi-link hinge 1602 can pass about three sides of the flexible display 1605. Similarly, one or both of the first multi-link hinge 1601 or the second multi-link hinge 1602 can comprise one or more struts to bias one or more of the first device housing 1671, the second device housing 1672, or the third device housing 1673 distally away from one or both of the first multi-link hinge 1601 or the second multi-link hinge 1602. These struts can be spring loaded to bias the electronic device 1600 in one or more of an open position or a closed, i.e., folded, position (shown in FIG. 17, a partially folded position (shown in FIG. 16), or combinations thereof.

In one or more embodiments both the first multi-link hinge 1601 and the second multi-link hinge 1602 comprise links coupled to adjacent links by one or more pins defining a pin line having a greater bend radius about both the first multi-link hinge 1601 and the second multi-link hinge 1602 than the flexible display. One or both of the first multi-link hinge 1601 and the second multi-link hinge 1602 can include pivot restrictors operable to oppose motion of the first device housing 1671, the second device housing 1672, or the third device housing 1673 about one or both of the first multi-link hinge 1601 and the second multi-link hinge 1602. These pivot restrictors can be frictional elements, cam and followers, gears, or other mechanical assemblies.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while bending was the primary mode of changing a geometry of an electronic device, the multi-link hinges described herein could be used with other techniques, such as flexible housing portions, that allow squeezing, stretching, pulling, and shaking also to be used to change the geometry of an electronic device.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:
1. An electronic device, comprising:
a first device housing and a second device housing;
a hinge coupling the first device housing to the second device housing, the first device housing pivotable about the hinge relative to the second device housing, the hinge comprising at least one purlin; and
a flexible display coupled to the first device housing and the second device housing and spanning the hinge;
the flexible display to deform, with the at least one purlin resting on a major face of the flexible display to mechanically support the flexible display when the first device housing pivots about the hinge relative to the second device housing.

2. The electronic device of claim 1, the hinge comprising one or more linkage members.

3. The electronic device of claim 2, the one or more linkage members coupled together by one or more pins defining a pin line when the first device housing and the second device housing are coplanar.

4. The electronic device of claim 3, at least a portion of the flexible display disposed within a plane defined by the pin line when the first device housing and the second device housing are coplanar.

5. The electronic device of claim 3, the pin line defining a greater bend radius about the hinge than the flexible display.

6. The electronic device of claim 2, each linkage member comprising a first link and a second link separated by a corresponding purlin.

7. The electronic device of claim 6, the corresponding purlin spanning a width of the flexible display to support the flexible display when the first device housing pivots about the hinge relative to the second device housing.

8. The electronic device of claim 7, the corresponding purlin defined by side members that taper from a base member as they extend distally from the flexible display.

9. The electronic device of claim 2, the hinge comprising:
at least a first link coupled to the first housing;
at least a second link coupled to the first housing; and
a pivot coupled between the at least a first link and the at least a second link.

10. The electronic device of claim 9, further comprising one or more struts, coupled to the pivot, to bias one or more of the first device housing or the second device housing distally away from the pivot.

11. The electronic device of claim 10, the pivot comprising a cam and follower.

12. The electronic device of claim 11, the follower comprising one or more detents to retain the first device housing at a predefined angular alignment relative to the second device housing about the hinge.

13. The electronic device of claim 10, the pivot comprising:
a first strut disposed between the pivot and the first device housing and pivotable about a first axis; and
a second strut disposed between the pivot and the second device housing and pivotable about a second axis, different from the first axis.

14. The electronic device of claim 13, further comprising a frictional coupler operable the first strut to oppose motion of the first strut about the first axis.

15. A bendable electronic device, comprising:
a multi-link hinge coupling a first device housing to a second device housing; and
a flexible display coupled to the first device housing and the second device housing and spanning the multi-link hinge;
each link of the multi-link hinge passing about three sides of the flexible display.

16. The bendable electronic device of claim 15, further comprising one or more struts to bias one or more of the first device housing or the second device housing distally away from the multi-link hinge.

17. The bendable electronic device of claim 16, the one or more struts spring loaded to bias the bendable electronic device in one or more of an open position with the first device housing and the second device housing disposed on opposite sides of the multi-link hinge or a closed position with the first device housing and the second device housing disposed on a common side of the multi-link hinge.

18. The bendable electronic device of claim 15, the each link coupled to an adjacent link by one or more pins defining a pin line having a greater bend radius about the multi-link hinge than the flexible display.

19. The bendable device of claim 15, the multi-link hinge comprising a pivot restrictor operable to oppose motion of the first device housing or the second device housing about the multi-link hinge.

20. The bendable device of claim 19, the pivot restrictor comprising a cam and follower.

* * * * *